United States Patent
Kiyamura

(10) Patent No.: US 8,264,106 B2
(45) Date of Patent: Sep. 11, 2012

(54) MOTOR AND DRIVING DEVICE HAVING INTEGRALLY FORMED MAGNETIC-POLE PORTIONS

(75) Inventor: Kousuke Kiyamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 366 days.

(21) Appl. No.: 12/258,241

(22) Filed: Oct. 24, 2008

(65) Prior Publication Data

US 2009/0108701 A1 Apr. 30, 2009

(30) Foreign Application Priority Data

Oct. 26, 2007 (JP) ................... 2007-278965

(51) Int. Cl.
*H02K 37/14* (2006.01)
*H02K 37/10* (2006.01)
*H02K 37/12* (2006.01)

(52) U.S. Cl. .......... 310/49.34; 310/49.35; 310/257; 310/216.101; 310/216.103

(58) Field of Classification Search .......... 310/49.34, 310/49.35, 257; *H02K 37/00, 37/04, 37/10, H02K 37/12, 37/14, 37/16, 37/18*
See application file for complete search history.

(56) References Cited

U.S. PATENT DOCUMENTS

| | | | | | |
|---|---|---|---|---|---|
| 3,633,055 | A | * | 1/1972 | Maier | 310/257 |
| 4,286,180 | A | * | 8/1981 | Langley | 310/12.27 |
| 4,823,038 | A | * | 4/1989 | Mizutani et al. | 310/257 |
| 5,220,228 | A | * | 6/1993 | Sibata | 310/156.46 |
| 5,973,425 | A | * | 10/1999 | Aoshima | 310/49.19 |
| 2004/0227413 | A1 | * | 11/2004 | Kuwert et al. | 310/12 |
| 2006/0088304 | A1 | * | 4/2006 | Aoshima | 396/85 |
| 2007/0075605 | A1 | * | 4/2007 | Enomoto et al. | 310/257 |

FOREIGN PATENT DOCUMENTS

JP 05-161333 6/1993
JP 2006-121829 5/2006

OTHER PUBLICATIONS

"Integral." Dictionary.com Unabridged. Random House, Inc. Jan. 31, 2012. <Dictionary.com http://dictionary.reference.com/browse/integral>.*

* cited by examiner

*Primary Examiner* — Quyen Leung
*Assistant Examiner* — Michael Andrews
(74) *Attorney, Agent, or Firm* — Canon USA Inc IP Division

(57) ABSTRACT

A magnetic-pole portion can be formed by thread cutting, whereby a motor can be provided at lower cost as compared to a case where the magnetic-pole portion is formed by press-working.

6 Claims, 9 Drawing Sheets

MOTOR AND DRIVING DEVICE HAVING INTEGRALLY FORMED MAGNETIC-POLE PORTIONS

BACKGROUND OF THE INVENTION

1. Field of the Invention

The present invention relates to two-phase permanent-magnet (PM) stepping motors.

2. Description of the Related Art

Japanese Patent Laid-Open No. 5-161333 discloses a stepping motor configured to rotate as a result of an interaction between a magnet and yokes that are excited by a coil.

Japanese Patent Laid-Open No. 2006-121829 discloses a lens driving device used in, for example, a camera. This lens driving device is configured to drive a lens in a translatory motion by utilizing an interaction between a spirally magnetized magnet and a yoke extending along the spirally magnetized magnet.

Regarding the stepping motor disclosed in Japanese Patent Laid-Open No. 5-161333, the yokes are manufactured by press-working. Specifically, this press-working process for manufacturing a yoke involves perforating a flat plate to form magnetic-pole teeth in a planar fashion, and then bending the magnetic-pole teeth upward.

However, if the magnetic-pole teeth are to be made longer in the axial direction of the yoke in order to increase the area of the yoke that faces the magnet without changing the outer diameter of the motor, the magnetic-pole teeth formed in a planar fashion in the perforating step would become too long to fit within the flat plate. For this reason, the magnetic-pole teeth would need to be expanded by, for example, drawing during the bending step.

FIGS. 10A and 10B illustrate a yoke manufactured by press-working. Specifically, FIG. 10A includes part A-1 and part A-2 that illustrate the yoke after a perforating step, and FIG. 10B includes part B-1 and part B-2 that illustrate the yoke after a bending step. The magnetic-pole teeth in part A-1 have a height h that is smaller than an inner radius R. Consequently, the magnetic-pole teeth in part B-2 similarly have a height h' that is smaller than the inner radius R. Although the height h' can be increased by performing a drawing step, that would increase the manufacturing cost. In addition, performing a drawing step would not increase the height h' by a significant amount, and therefore, there is a limit to increasing the height h'.

Consequently, with a press-working technique, it is difficult to form magnetic-pole teeth that are long in the axial direction at low cost. In other words, forming such magnetic-pole teeth by press-working is problematic in that it requires high manufacturing cost.

In addition, since two yokes that are excited by a single coil are provided as separate components, the positional relationship between the magnetic-pole teeth of the two yokes can vary depending on the assembly accuracy, which may inhibit the motor from operating stably.

Regarding the lens driving device disclosed in Japanese Patent Laid-Open No. 2006-121829, the magnetic-pole teeth extend spirally along magnetized segments of the magnet and are relatively long. Since these magnetic-pole teeth extend at a predetermined angle, the adjacent magnetic-pole teeth tend to contact each other during the perforating step.

FIGS. 11A and 11B illustrate a yoke manufactured by press-working and having slanted magnetic-pole teeth. Specifically, FIG. 11A includes part A-1 and part A-2 that illustrate the yoke after a perforating step, and FIG. 11B includes part B-1 and part B-2 that illustrate the yoke after a bending step. Referring to part A-1, since the tip ends of the adjacent magnetic-pole teeth can undesirably contact each other depending on the length L and the slanted angle $\theta$ of the magnetic-pole teeth, the design flexibility is limited. In addition, it is difficult to perform the bending step while properly maintaining the slanted angle $\theta$.

Due to these reasons, it is difficult to manufacture yokes by employing a press-working technique, and moreover, in order to manufacture yokes that are sufficiently suitable for motors having stable performance, high manufacturing costs are required.

In addition, since the two yokes that are excited by a single coil are provided as separate components, the positional relationship between the magnetic-pole teeth of the two yokes can vary depending on the assembly accuracy, which may inhibit the motor from operating stably.

SUMMARY OF THE INVENTION

The present invention provides a low-cost motor and driving device with stable performance.

According to an aspect of the present invention, a motor includes a cylindrical magnet whose outer periphery is magnetized and is divided in a circumferential direction thereof; a cylindrical yoke having an inner periphery that is disposed facing the magnet; a coil that excites the yoke; a first magnetic-pole portion that is formed in the inner periphery of the yoke, extends in an axial direction of the magnet, and is excited by the coil; and a second magnetic-pole portion that is formed in the inner periphery of the yoke, extends in the axial direction of the magnet, and is excited by the coil to a pole that is different from that of the first magnetic-pole portion. The first magnetic-pole portion and the second magnetic-pole portion are linked to each other by a thin-wall portion having a thickness that is smaller in a radial direction of the yoke as compared to thicknesses of the first magnetic-pole portion and the second magnetic-pole portion in the radial direction.

According to another aspect of the present invention, a driving device includes a cylindrical magnet whose outer periphery has a spirally magnetized segment; a first cylindrical yoke having an inner periphery that is disposed facing the magnet; a second cylindrical yoke having an inner periphery that is disposed facing the magnet; a first coil that excites the first yoke; a second coil that excites the second yoke; a guide portion that is movable integrally with the magnet in a direction parallel to a rotation axis; a guide shaft that supports the guide portion in a movable fashion in the direction parallel to the rotation axis; a first magnetic-pole portion that is formed in an inner periphery of the first yoke, extends along the magnetized segment, and is excited by the first coil; a second magnetic-pole portion that is formed in the inner periphery of the first yoke, extends along the magnetized segment, and is excited by the first coil to a pole that is different from that of the first magnetic-pole portion; a third magnetic-pole portion that is formed in an inner periphery of the second yoke, extends along the magnetized segment, and is excited by the second coil; and a fourth magnetic-pole portion that is formed in the inner periphery of the second yoke, extends along the magnetized segment, and is excited by the second coil to a pole that is different from that of the third magnetic-pole portion. The first magnetic-pole portion and the second magnetic-pole portion are linked to each other by a thin-wall portion having a thickness that is smaller in a radial direction of the first yoke as compared to thicknesses of the first magnetic-pole portion and the second magnetic-pole portion in the radial direction. The third magnetic-pole portion and the fourth magnetic-pole portion are linked to each other by a thin-wall portion having a thickness that is smaller in a radial direction of the second yoke as compared to thicknesses of the third magnetic-pole portion and the fourth magnetic-pole portion in the radial direction.

Further features of the present invention will become apparent from the following description of exemplary embodiments with reference to the attached drawings.

DESCRIPTION OF THE EMBODIMENTS

First Exemplary Embodiment

Figure 1:
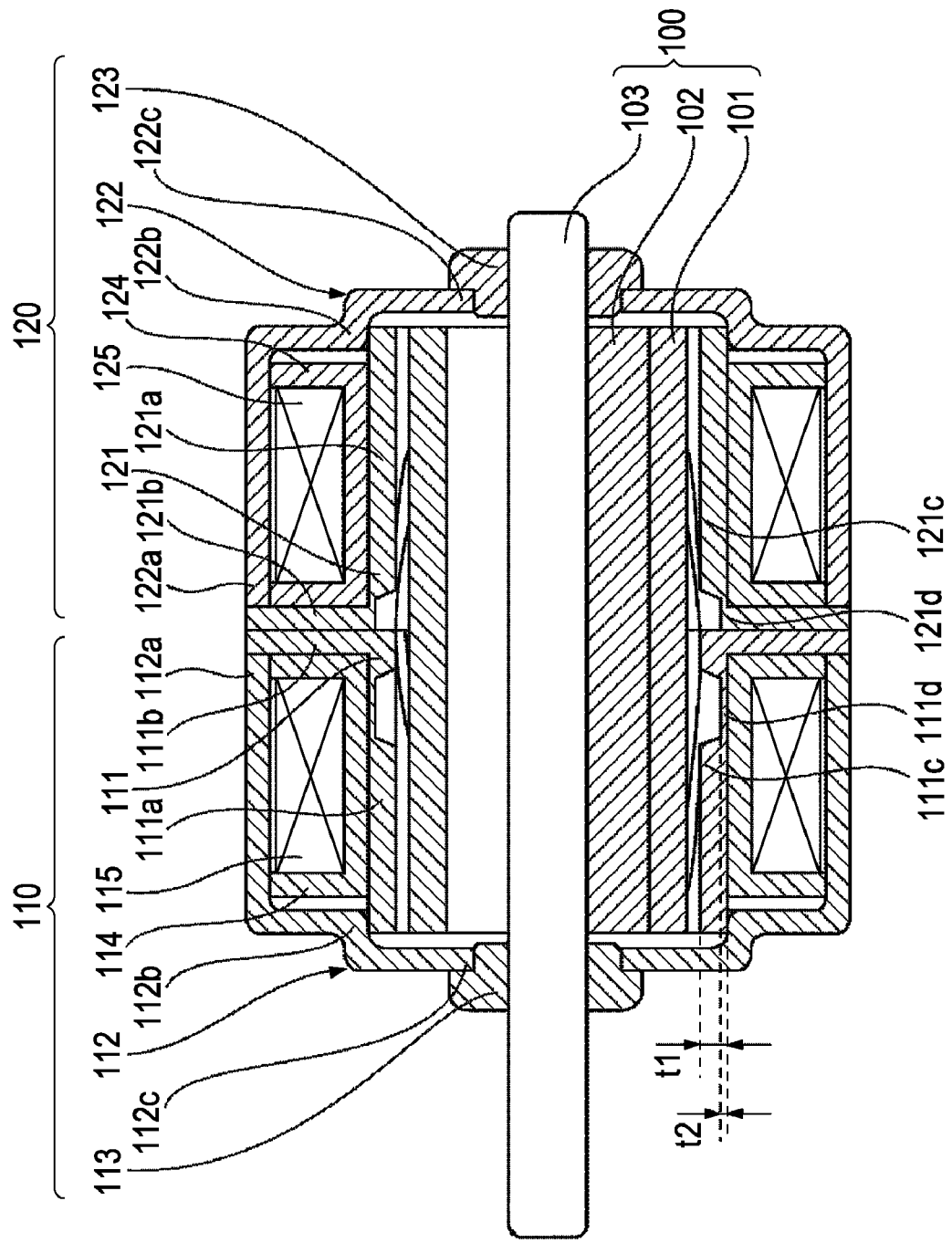
FIG. 1 is a cross-sectional view of a motor according to a first exemplary embodiment of the present invention taken along a line extending in an axial direction thereof.
Figure 2:
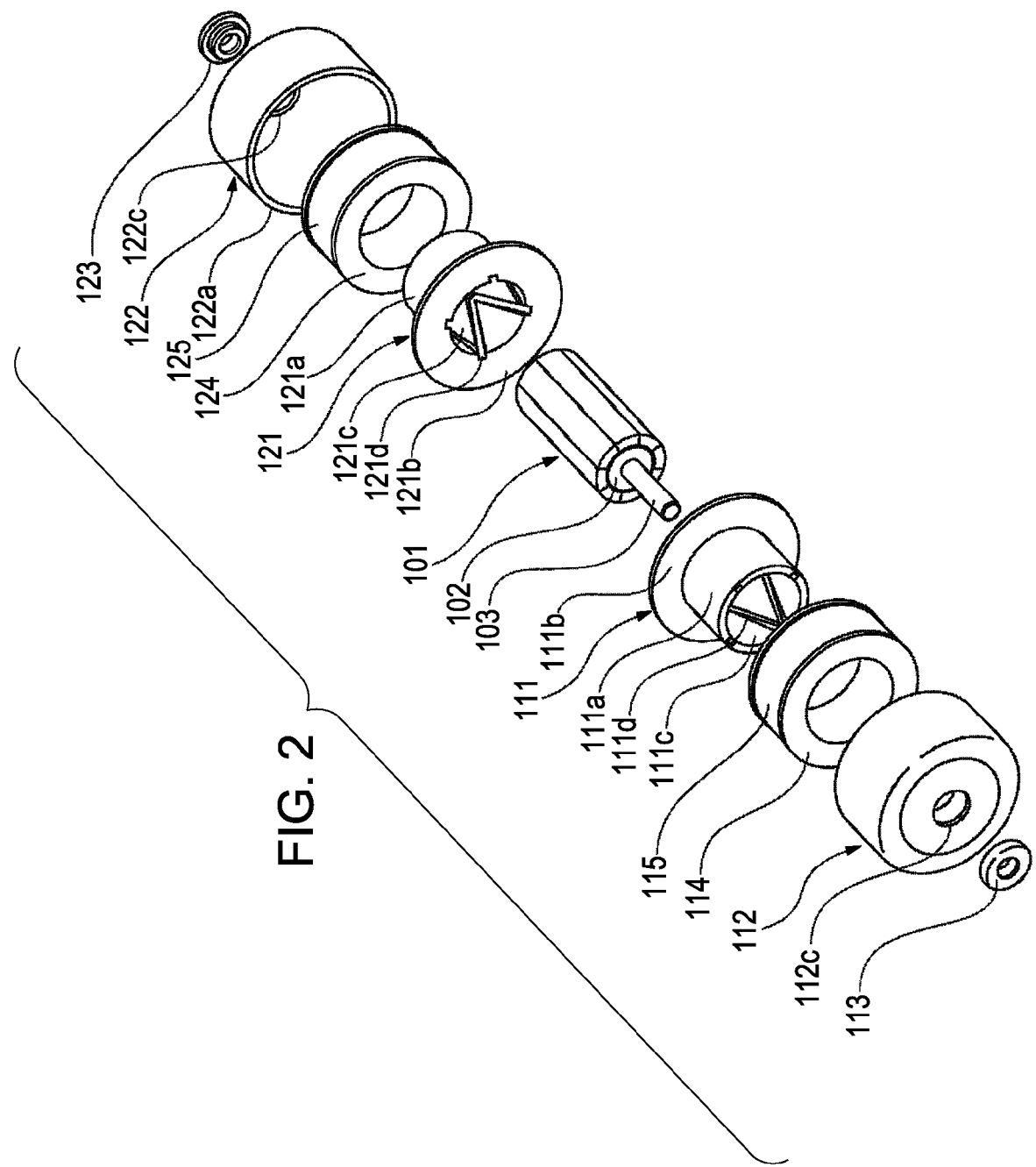
FIG. 2 is an exploded perspective view of the motor according to the first exemplary embodiment.

A first exemplary embodiment of the present invention is described below with reference to the drawings.
Configuration of Motor FIG. 1 is a cross-sectional view of a motor according to the first embodiment taken along a line extending in the axial direction thereof. FIG. 2 is an exploded perspective view of the motor according to the first embodiment.

Referring to FIGS. 1 and 2, the motor includes a cylindrical magnet 101 whose outer periphery is divided into magnetized segments in the circumferential direction. Although the magnet 101 has magnetized segments of 8 poles in the first embodiment, the first embodiment of the present invention is not limited based on the number of poles.

The motor also includes a cylindrical core 102 whose outer periphery is fitted in or adhered to the inner periphery of the magnet 101 so as to be integrally fixed to the magnet 101.

Moreover, the motor includes a shaft 103. The inner periphery of the core 102 and part of the outer periphery of the shaft 103 are fitted or adhered to each other so as to be integrally fixed to each other. The shaft 103 is rotatably secured in position in a manner such that the part of the outer periphery thereof is slidable with respect to a first bearing 113 and a second bearing 123 to be described later. The opposite ends of the shaft 103 axially protrude from a first stator 110 and a second stator 120 to be described later, such that when the shaft 103 rotates, the power produced as a result of the rotation can be delivered to the outside.

The magnet 101, the core 102, and the shaft 103 constitute a rotor 100.

Reference numeral 111 denotes a first yoke composed of a soft magnetic material. The first yoke 111 has a cylindrical portion 111a, a flange portion 111b, a magnetic-pole portion 111c extending along the inner periphery of the cylindrical portion 111a in the axial direction, and a threaded thin-wall portion 111d. When the magnetic-pole portion 111c has a thickness of t1 in the radial direction and the thin-wall portion 111d has a thickness of t2 in the radial direction, the following condition is satisfied: t1>t2. Furthermore, the thickness t2 of the thin-wall portion 111d in the radial direction is preferably smaller than the thickness of the flange portion 111b in the axial direction and the thicknesses of a first casing 112 in the radial direction and the axial direction. The reason why the thin-wall portion 111d is preferably formed in this manner will be described below.

As an electric current flowing through a coil is increased, the magnetic field becomes stronger, causing flux saturation to occur first in a region with a smaller cross-sectional area than other magnetic paths, such a region being the thin-wall portion 111d in the first embodiment. As a result, the magnetic flux leaks into the air. In the motor according to the first embodiment, a rotational force of the motor is obtained due to an interaction between the magnet 101 and the magnetic flux leaking into the air through the thin-wall portion 111d. Supposing that the first casing 112 is thinner than (has a smaller cross-sectional area than) the thin-wall portion 111d in the radial direction, flux saturation would unfavorably occur first at the first casing 112. This is inefficient considering the amount of loss by flux saturation. Accordingly, the thin-wall portion 111d is preferably formed in the above-described manner.

Descriptions regarding the shape of the magnetic-pole portion 111c and the thin-wall portion 111d will be provided later.

The aforementioned first casing 112 has a shape of a cup and is composed of a soft magnetic material. The first casing 112 has an opening 112a, a bent portion 112b, and a hole 112c. The first casing 112 is secured in abutment with the flange portion 111b of the first yoke 111 in the axial direction at the opening 112a, whereby the positional relationship between the first yoke 111 and the first casing 112 is determined in the axial direction. The inner periphery of the bent portion 112b is fitted around the outer periphery of the cylindrical portion 111a of the first yoke 111, whereby the positional relationship between the first yoke 111 and the first casing 112 is determined in the radial direction.

Furthermore, the hole 112c is fitted around the outer periphery of the first bearing 113 to be described later, whereby the positional relationship between the first casing 112 and the first bearing 113 is determined in the radial direction. In addition, the area surrounding the hole 112c is in abutment with a flange of the first bearing 113, whereby the positional relationship between the first casing 112 and the first bearing 113 is determined in the axial direction.

As an alternative to the first embodiment, the inner periphery of the opening 112a may be fitted around the outer periphery of the flange portion 111b of the first yoke 111, so that the positional relationship between the first yoke 111 and the first casing 112 can be determined in the radial direction. As another alternative to the first embodiment, an end of the cylindrical portion 111a of the first yoke 111 may be secured in abutment with part of the first casing 112 in the axial direction, so that the positional relationship between the first yoke 111 and the first casing 112 can be determined in the axial direction.

The aforementioned first bearing 113 is secured to the first casing 112 and is disposed slidably with respect to the shaft 103 as described above. Reference numeral 114 denotes a first bobbin composed of a nonconductive material. Reference numeral 115 denotes a first coil that is wound around the first bobbin 114.

The first yoke 111, the first casing 112, the first bearing 113, the first bobbin 114, and the first coil 115 constitute the first stator 110.

The second stator 120 is constituted by a second yoke 121, a second casing 122, a second bearing 123, a second bobbin 124, and a second coil 125. The second yoke 121, the second casing 122, the second bearing 123, the second bobbin 124, and the second coil 125 are substantially the same as the corresponding components that constitute the first stator 110, and therefore, descriptions of these components will not be repeated.

The second yoke 121 has components 121a to 121d that respectively correspond to the components 111a to 111d included in the first yoke 111. Therefore, since these components 121a to 121d have the same shape as the components 111a to 111d, the descriptions thereof will not be repeated.

The second casing 122 has components 122a to 122c that respectively correspond to the components 112a to 112c included in the first casing 112. Therefore, since these components 122a to 122c have the same shape as the components 112a to 112c, the descriptions thereof will not be repeated.

Shape of Magnetic-Pole Teeth

Figure 3:
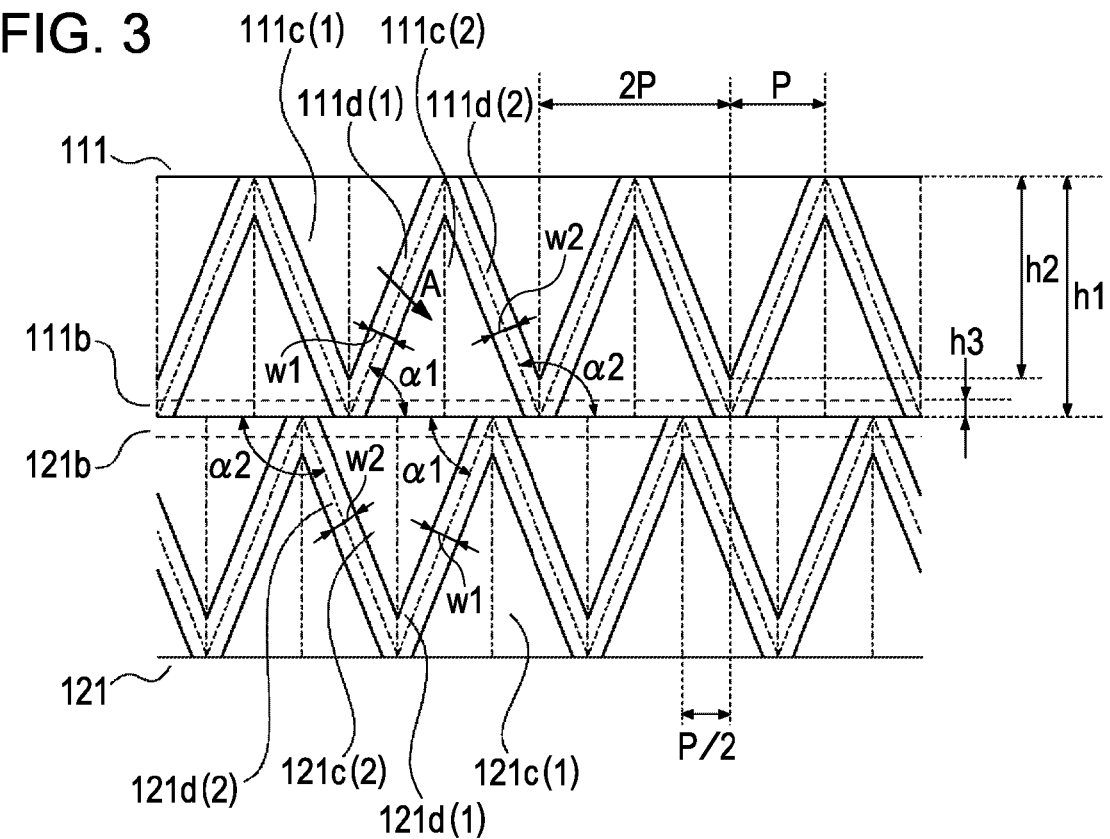
FIG. 3 is an unrolled view of yokes included in the motor according to the first exemplary embodiment.

FIG. 3 is an unrolled view of the yokes included in the motor according to the first embodiment. Specifically, FIG. 3 shows the cylindrical portions 111a and 121a of the first yoke 111 and the second yoke 121 in an unrolled state as viewed from the inner side thereof while the positional relationship between the two yokes in their actual combined state is maintained.

First, the first yoke 111 is described below with reference to FIG. 3.

The magnetic-pole portion 111c includes a first magnetic-pole portion 111c(1) having triangular magnetic-pole teeth arranged in the circumferential direction. The first magnetic-pole portion 111c(1) extends in the axial direction of the magnet 101 and is excited to a certain pole by a first coil. Each of the magnetic-pole teeth has a bottom side defined by an end surface of the first yoke 111 that is opposite to the end surface thereof adjacent to the flange portion 111b, and extends toward the end surface of the first yoke 111 adjacent to the flange portion 111b. A predetermined number N of magnetic-pole teeth are arranged at a predetermined phase interval 2P. When the number of poles of the magnet 101 is denoted by M, the number N and the phase interval 2P can be expressed as follows:

$$N=M/2$$

$$2P=2\times 360°/M$$

In the first embodiment where the magnet 101 has 8 poles, the number of magnetic-pole teeth is 4 and the phase interval of the magnetic-pole teeth is 90°.

The magnetic-pole portion 111c also includes a second magnetic-pole portion 111c(2) having triangular magnetic-pole teeth arranged in the circumferential direction. The second magnetic-pole portion 111c(2) extends in the axial direction of the magnet 101 and is excited to a certain pole by a second coil. Each of the magnetic-pole teeth has a bottom side defined by the end surface of the first yoke 111 adjacent to the flange portion 111b, and extends toward the end surface of the first yoke 111 that is opposite to the end surface adjacent to the flange portion 111b. The number of magnetic-pole teeth and the phase interval of the magnetic-pole teeth are the same as those in the first magnetic-pole portion 111c(1).

The magnetic-pole portions 111c(1) and 111c(2) are formed while being given a predetermined phase difference. A phase difference P can be expressed as follows:

$$P=360°/M$$

In the first embodiment where the magnet 101 has 8 poles, the phase difference between the magnetic-pole portions 111c(1) and 111c(2) is 45°.

The magnetic-pole teeth are preferably formed such that, when the height of the cylindrical portion 111a in the axial direction is denoted by h1, the height of the magnetic-pole portion 111c in the axial direction is denoted by h2, and the height of the flange portion 111b in the axial direction is denoted by h3, the following relationships are satisfied:

$$h1>h2$$

$$h1-h2>h3$$

The thin-wall portion 111d includes a first thin-wall portion 111d(1) extending at a predetermined angle α1 with respect to the circumferential direction and having a predetermined width w1. The first thin-wall portion 111d(1) has a shape of a multiple thread screw, and the number of threads J can be expressed as follows:

$$J=M/2$$

In the first embodiment where the magnet 101 has 8 poles, the number of threads is 4.

The thin-wall portion 111d also includes a second thin-wall portion 111d(2) extending at a predetermined angle α2 with respect to the circumferential direction and having a predetermined width w2. The second thin-wall portion 111d(2) has a shape of a multiple thread screw, and the number of threads is equal to that of the first thin-wall portion 111d(1).

The shape of the magnetic-pole portions 111c(1) and 111c(2) is determined in accordance with the thin-wall portions 111d(1) and 111d(2).

The thin-wall portions 111d(1) and 111d(2) are preferably formed such that the predetermined angles α1 and α2 have the following relationship:

$$\alpha 1+\alpha 2=180°$$

$$\tan \alpha 1 = h1/P$$

Although the thin-wall portions 111d(1) and 111d(2) are formed in a continuous pattern in the first embodiment, they may be divided from each other by the magnetic-pole portions 111c(1) and 111c(d), or the thin-wall portions 111d(1) and 111d(2) may partially extend through the cylindrical portion 111a in the radial direction.

The thin-wall portions 111d(1) and 111d(2) can be formed by multiple thread cutting.

To describe the procedure of this forming process in detail, a tap 1 having J threads and a lead angle equal to the angle α1 and a tap 2 having J threads and a lead angle equal to the angle α2 are first prepared. Then, with respect to the first yoke 111 having the cylindrical portion 111a and the flange portion 111b, a first thin-wall portion 111d(1) is formed in the inner periphery of the cylindrical portion 111a by using the tap 1. Subsequently, the tap 2 is used to form a second thin-wall portion 111d(2) in the inner periphery of the cylindrical portion 111a. As a result, the first yoke 111 having the shape according to the first embodiment can be obtained. In other words, the thin-wall portions 111d(1) and 111d(2) are formed by using two different kinds of taps.

In the case where the flange portion 111b is a separate component, the flange portion 111b may be attached to the cylindrical portion 111a by, for example, welding after completion of the thread cutting process performed on the cylindrical portion 111a. Alternatively, the flange portion 111b may be formed by, for example, cutting the outer periphery of the cylindrical portion 111a after completion of the thread cutting process performed on the cylindrical portion 111a.

The shape of the magnetic-pole portion 111c and the thin-wall portion 111d is freely modifiable by changing the teeth shape and the lead angle of each tap. For example, the height h2 of the magnetic-pole portion 111c in the axial direction is freely modifiable.

With any one of the above-described procedures for forming the first yoke 111, the first magnetic-pole portion 111c(1) and the second magnetic-pole portion 111c(2) can be connected to the thin-wall portions 111d(1) and 111d(2) having a thickness smaller than that of the first magnetic-pole portion 111c(1) and the second magnetic-pole portion 111c(2) in the radial direction. The above-described configuration is similarly applied to a third magnetic-pole portion and a fourth magnetic-pole portion in the second yoke 121 to be described later.

Because the second yoke 121 has the same structure as the first yoke 111, the description thereof will not be repeated. More specifically, the second yoke 121 has components 121c(1), 121c(2), 121d(1), and 121d(2) that respectively correspond to and have the same shape as the components 111c(1), 111c(2), 111d(1), and 111d(2) included in the first yoke 111. The first yoke 111 and the second yoke 121 are combined such that the magnetic-pole portion 111c of the first yoke 111 and a magnetic-pole portion 121c of the second yoke 121 have a predetermined phase difference P/2, which can be expressed as follows:

$$P/2 = 360°/(2 \times M)$$

In the first embodiment where the magnet 101 has 8 poles, the phase difference P/2 is 22.5°.

Operation

Figure 4:
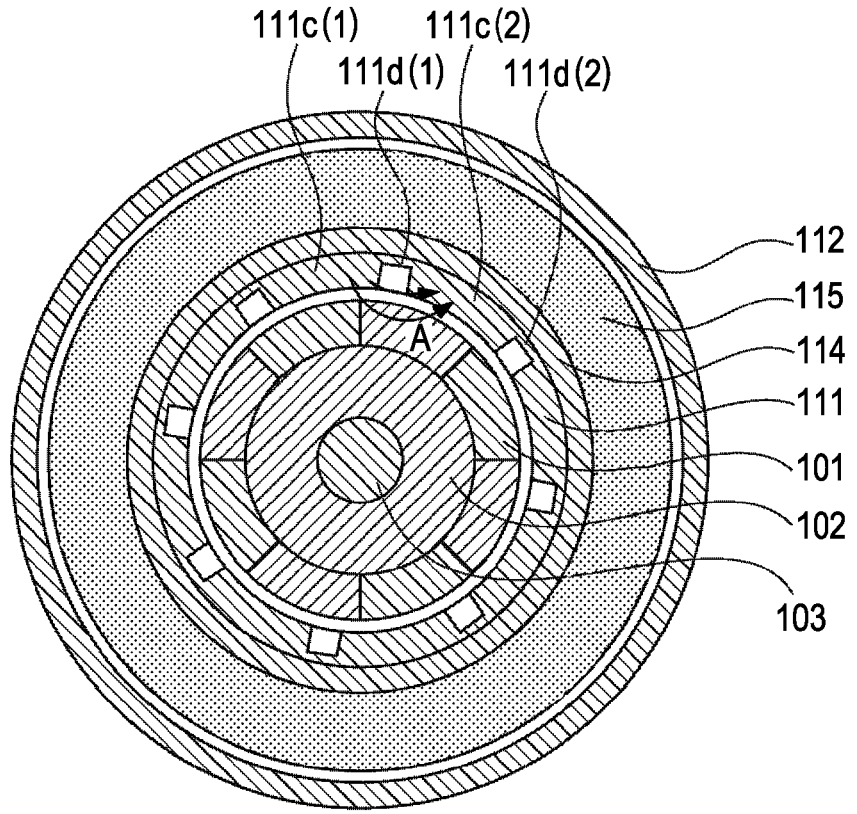
FIG. 4 is a cross-sectional view of the motor according to the first exemplary embodiment taken along a line extending in a radial direction thereof.

FIG. 4 is a cross-sectional view of the motor according to the first embodiment taken along a line extending in the radial direction thereof.

First, the operation of the first stator 110 is described below.

When an electric current is applied to the first coil 115, a magnetic field centered around the conducting line of the first coil 115 is generated. In response to this magnetic field, magnetic flux is produced in the cylindrical portion 111a of the first yoke 111, the flange portion 111b of the first yoke 111, and the interior of the first casing 112, thus forming a magnetic path. As the electric current is increased to amplify the magnetic flux produced in the first yoke 111 and the interior of the first casing 112, flux saturation occurs in a region where the cross-sectional area taken along a line extending in the direction of magnetic flux is small, resulting in leakage of the magnetic flux into the air.

In the first embodiment, the thin-wall portion 111d of the first yoke 111 is made thinner in the radial direction as compared to the thickness of the magnetic-pole portion 111c in the radial direction, the thickness of the flange portion 111b in the axial direction, and the thicknesses of the first casing 112 in the radial and axial directions. Therefore, the thin-wall portion 111d is where flux saturation is most likely to occur, which implies that magnetic flux leaks into the air in between the first magnetic-pole portion 111c(1) and the second magnetic-pole portion 111c(2).

For example, referring to FIGS. 3 and 4, when a sufficient amount of electric current is applied to the first coil 115, flux saturation occurs at the first thin-wall portion 111d(1), and the magnetic flux leaks in a direction of an arrow A, causing the first magnetic-pole portion 111c(1) to be excited to the N-pole and the second magnetic-pole portion 111c(2) to be excited to the S-pole. In this case, a force acting in the rotational direction is produced on the rotor 100 due to an interaction between the leakage magnetic flux and the magnetic field generated by the magnet 101. The rotor 100 is rotated by a predetermined angle in response to the force acting in the rotational direction.

Because the second stator 120 operates in the same manner, the description of the operation thereof will not be repeated.

By sequentially switching the direction of electric current applied to the first coil 115 and the second coil 125 as mentioned above, a rotational movement similar to that of the two-phase PM stepping motor in Japanese Patent Laid-Open No. 5-161333 can be achieved.

As described above, the magnetic-pole portion 111c of the motor according to the first embodiment can advantageously be formed by thread cutting, whereby a motor can be provided at lower cost as compared to the case where the magnetic-pole portion is formed by press-working.

In addition, in contrast to the yoke of the related art formed by press-working in which the magnetic-pole portion has a limitation in terms of its height, the shape of each magnetic-pole portion in the motor according to the first embodiment is freely modifiable by changing the teeth shape and the lead angle of the tap. Consequently, a yoke having magnetic-pole teeth that are long in the axial direction can be formed readily, whereby a high-torque motor can be provided at low cost.

In contrast to the related art where a pair of magnetic-pole portions excited by a single coil is provided as separate components, the pair of magnetic-pole portions in the motor according to the first embodiment are formed integrally. Thus, the positional relationship between the magnetic-pole teeth can be determined accurately, and the magnetic-pole portions can be made more resistant to deformation. As a result, a motor with stable performance can be provided.

Although the first embodiment is directed to a two-phase stepping motor, the first embodiment is not limited to a two-phase stepping motor and is also applicable to a two-or-more-phase stepping motor.

Second Exemplary Embodiment

Configuration of Driving Device

Figure 5:
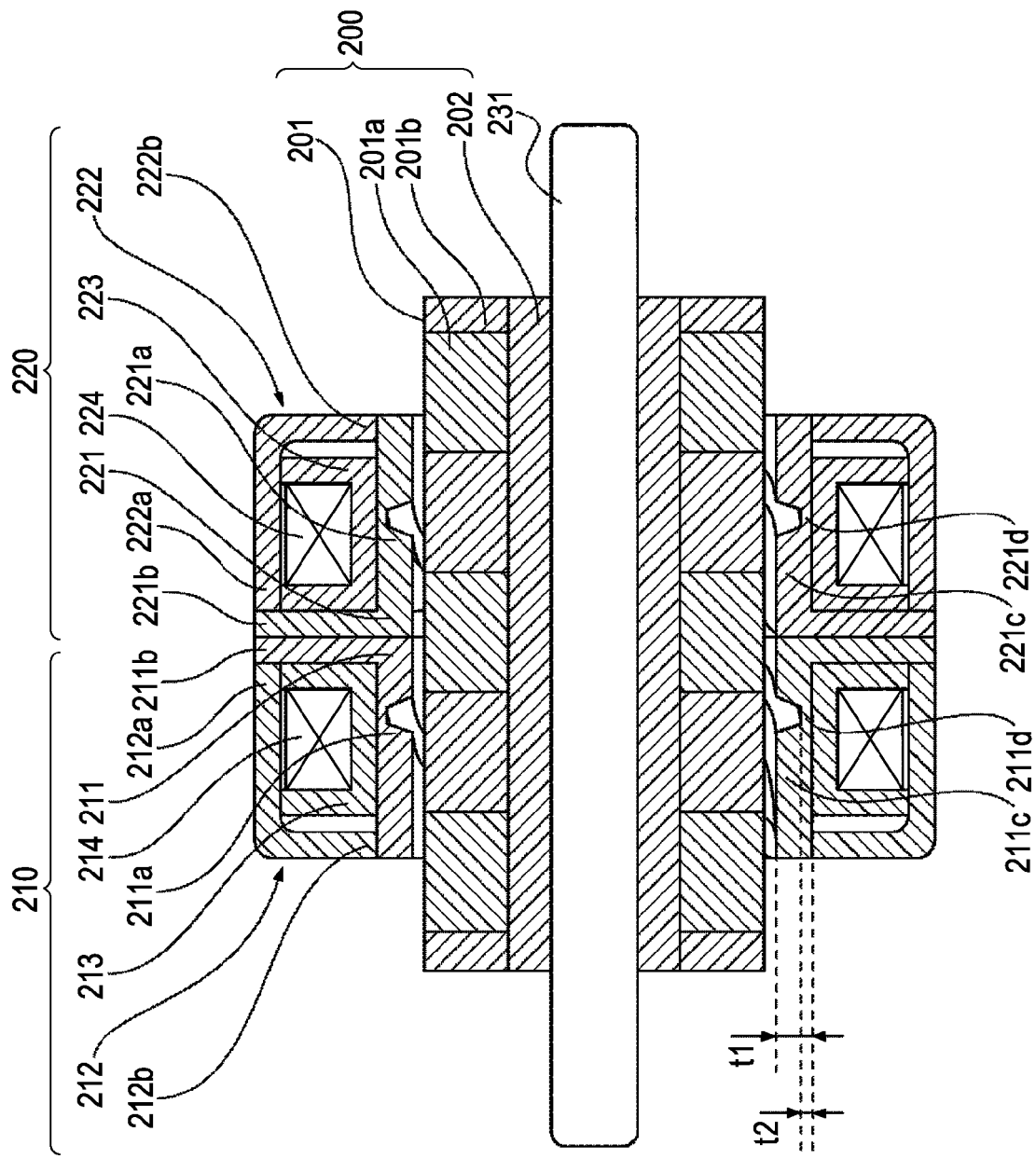
FIG. 5 is a cross-sectional view of a driving device according to a second exemplary embodiment of the present invention taken along a line extending in an axial direction thereof.
Figure 6:
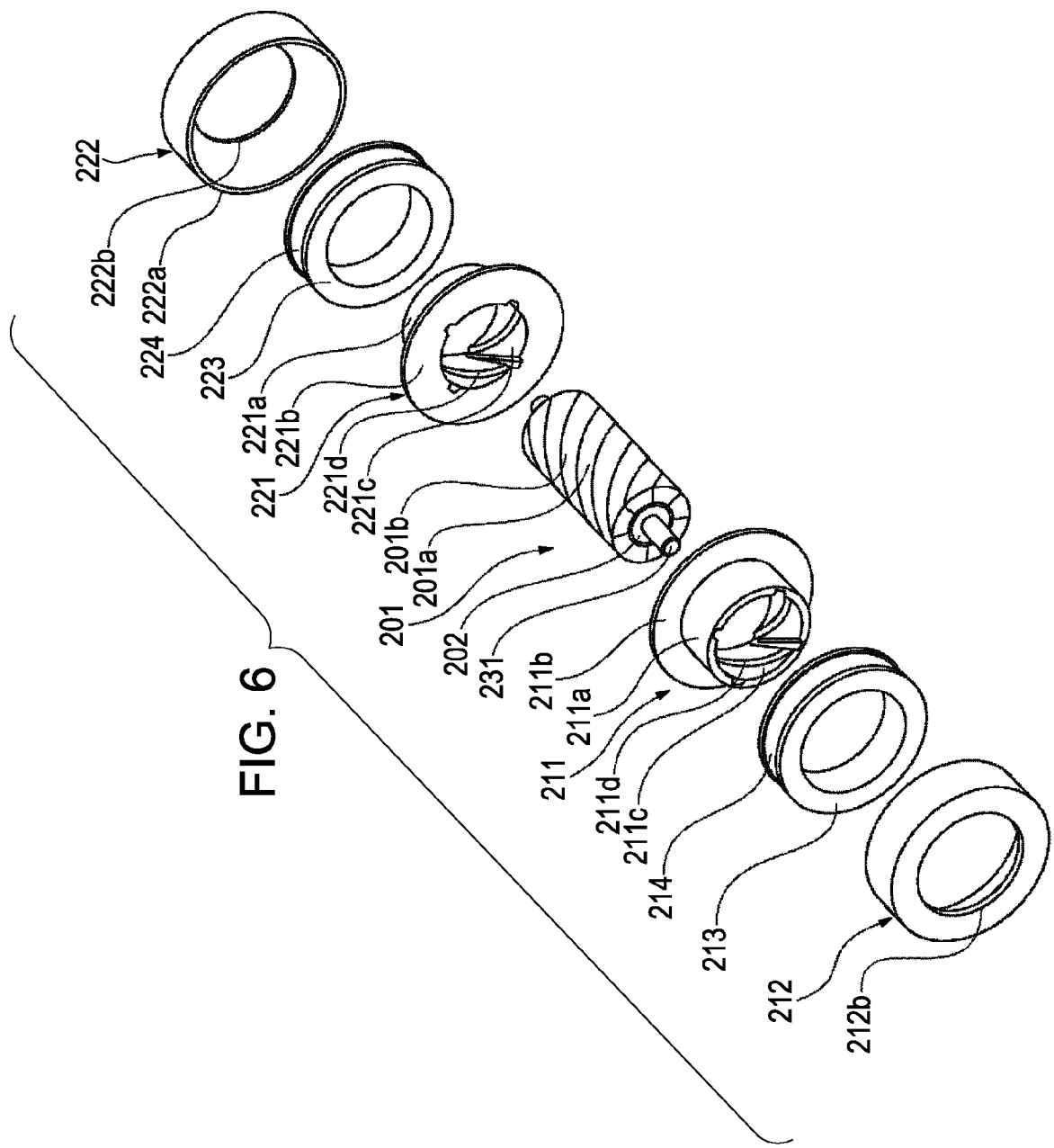
FIG. 6 is an exploded perspective view of the driving device according to the second exemplary embodiment.

FIG. 5 is a cross-sectional view of a driving device according to a second exemplary embodiment of the present invention taken along a line extending in the axial direction thereof. FIG. 6 is an exploded perspective view of the driving device according to the second exemplary embodiment.

Referring to FIGS. 5 and 6, the driving device includes a cylindrical magnet 201 whose outer periphery is divided into spirally magnetized segments. These magnetized segments include N-pole magnetized segments 201a and S-pole magnetized segments 201b. Although the magnet 201 has magnetized segments of 8 poles in the second embodiment, the second embodiment of the present invention is not limited based on the number of poles.

The driving device also includes a cylindrical tube 202 serving as a guide portion. The outer periphery of the tube 202 is fitted in or adhered to the inner periphery of the magnet 201 so as to be integrally fixed to the magnet 201. On the other hand, the inner periphery of the tube 202 is slidably fitted around the outer periphery of a guide shaft 231 to be described below. The guide shaft 231 supports the tube 202 in a movable fashion in a direction parallel to the rotation axis.

The magnet 201 and the tube 202 constitute a movable unit 200. The movable unit 200 is restricted from moving in the radial direction by the guide shaft 231, and is also restricted from moving in the rotational direction by a rotation stopper (not shown). Therefore, the movable unit 200 is held movable only in the direction parallel to the rotation axis.

Reference numeral 211 denotes a first yoke composed of a soft magnetic material. The first yoke 211 has a cylindrical portion 211a, a flange portion 211b, a magnetic-pole portion 211c extending along the inner periphery of the cylindrical portion 211a so as to face the magnetized segments 201a and 201b, and a threaded thin-wall portion 211d. When the magnetic-pole portion 211c has a thickness of t1 in the radial direction and the thin-wall portion 211d has a thickness of t2 in the radial direction, the following condition is satisfied: t1>t2. The thickness t2 of the thin-wall portion 211d in the radial direction is preferably smaller than the thickness of the flange portion 211b in the axial direction, and the thicknesses of a first casing 212 in the radial direction and the axial direction. The reason why the thin-wall portion 211d is preferably formed in this manner is the same as the reason described in the first embodiment.

Descriptions regarding the shape of the magnetic-pole portion 211c and the thin-wall portion 211d will be provided later.

The aforementioned first casing 212 has a shape of a cup and is composed of a soft magnetic material. The first casing 212 has an opening 212a and a hole 212b.

The first casing 212 is secured in abutment with the flange portion 211b of the first yoke 211 in the axial direction at the opening 212a, whereby the positional relationship between the first yoke 211 and the first casing 212 is determined in the axial direction. The inner periphery of the hole 212b is fitted around the outer periphery of the cylindrical portion 211a of the first yoke 211, whereby the positional relationship between the first yoke 211 and the first casing 212 is determined in the radial direction.

As an alternative to the second embodiment, the inner periphery of the opening 212a may be fitted around the outer periphery of the flange portion 211b of the first yoke 211, so that the positional relationship between the first yoke 211 and the first casing 212 can be determined in the radial direction. As another alternative to the second embodiment, an end of the cylindrical portion 211a of the first yoke 211 may be secured in abutment with part of the first casing 212 in the axial direction, so that the positional relationship between the first yoke 211 and the first casing 212 can be determined in the axial direction.

Reference numeral 213 denotes a first bobbin composed of a nonconductive material. Reference numeral 214 denotes a first coil that is wound around the first bobbin 213.

The first yoke 211, the first casing 212, the first bobbin 213, and the first coil 214 constitute a first stator 210.

A second stator 220 is constituted by a second yoke 221, a second casing 222, a second bobbin 223, and a second coil 224. The second yoke 221, the second casing 222, the second bobbin 223, and the second coil 224 are substantially the same as the corresponding components that constitute the first stator 210, and therefore, descriptions of these components will not be repeated.

The second yoke 221 has components 221a to 221d that respectively correspond to the components 211a to 211d included in the first yoke 211. Therefore, since these components 221a to 221d have the same shape as the components 211a to 211d, the descriptions thereof will not be repeated.

The second casing 222 has components 222a and 222b that respectively correspond to the components 212a and 212b included in the first casing 212. Therefore, since these components 222a and 222b have the same shape as the components 212a and 212b, the descriptions thereof will not be repeated.

Shape of Magnetic-Pole Teeth

Figure 7:
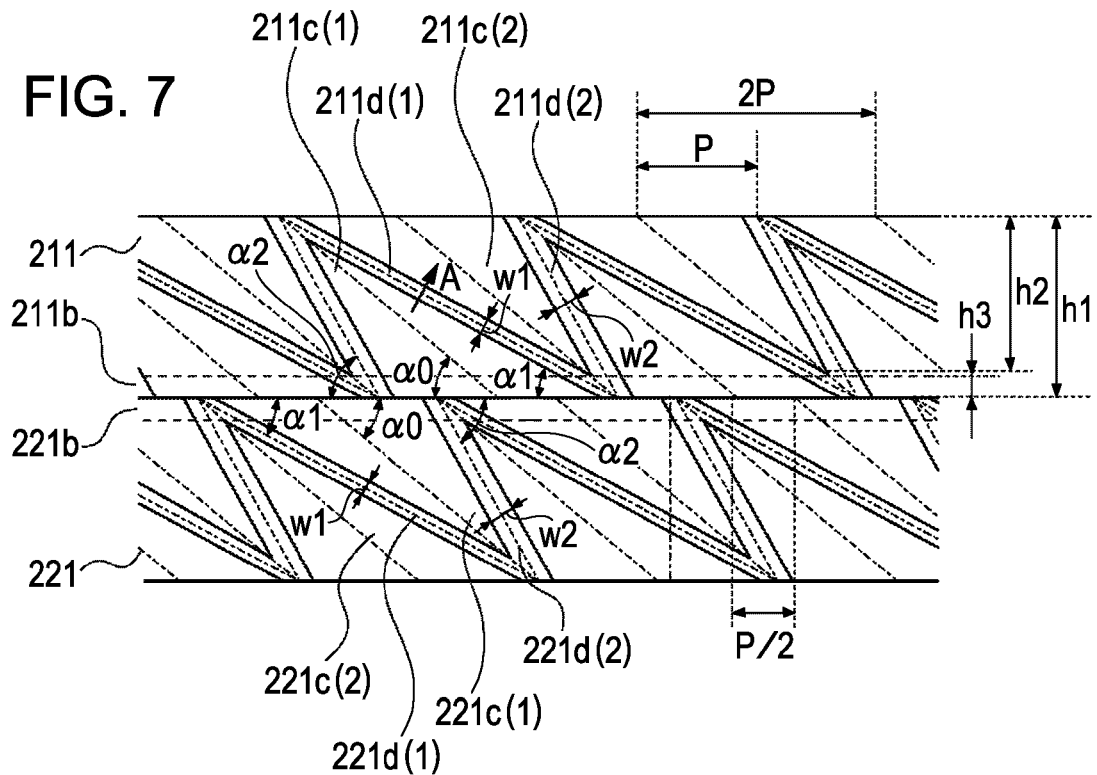
FIG. 7 is an unrolled view of yokes included in the driving device according to the second exemplary embodiment.

FIG. 7 is an unrolled view of the yokes included in the driving device according to the second embodiment. Specifically, FIG. 7 shows the cylindrical portions 211a and 221a of the first yoke 211 and the second yoke 221 in an unrolled state as viewed from the inner side thereof while the positional relationship between the two yokes in their actual combined state is maintained.

First, the first yoke 211 is described below with reference to FIG. 7.

The magnetic-pole portion 211c includes a first magnetic-pole portion 211c(1) having triangular magnetic-pole teeth arranged in the circumferential direction. Each of the magnetic-pole teeth has a bottom side defined by an end surface of the cylindrical portion 211a adjacent to the flange portion 211b, and extends along the magnetized segments of the magnet 201 at a predetermined angle α0 with respect to the circumferential direction. Specifically, the angle α0 is formed between the center line of the bottom side and a line extending in the circumferential direction. When the angle of the magnetized segments of the magnet 201 with respect to the circumferential direction is denoted by θ, the angle θ and the angle α preferably have the following relationship:

$$\alpha 0 = \theta$$

The first magnetic-pole portion 211c(1) has a predetermined number N of magnetic-pole teeth that are arranged at a predetermined phase interval 2P. When the number of poles of the magnet 201 is denoted by M, the number N and the phase interval 2P can be expressed as follows:

$$N = M/2$$

$$2P = 2 \times 360°/M$$

In the second embodiment where the magnet 201 has 8 poles, the number of magnetic-pole teeth is 4 and the phase interval of the magnetic-pole teeth is 90°.

The magnetic-pole portion 211c also includes a second magnetic-pole portion 211c(2) having triangular magnetic-pole teeth arranged in the circumferential direction. Each of the magnetic-pole teeth has a bottom side defined by an end surface of the cylindrical portion 211a that is opposite to the end surface thereof adjacent to the flange portion 211b, and extends along the magnetized segments of the magnet 201 at a predetermined angle α0 with respect to the circumferential direction. The number of magnetic-pole teeth and the phase interval of the magnetic-pole teeth are the same as those in the first magnetic-pole portion 211c(1).

The magnetic-pole portions 211c(1) and 211c(2) are formed while being given a predetermined phase difference. A phase difference P can be expressed as follows:

$$P = 360°/M$$

In the second embodiment where the magnet 201 has 8 poles, the phase difference between the magnetic-pole portions 211c(1) and 211c(2) is 45°.

The magnetic-pole teeth are preferably formed such that, when the height of the cylindrical portion 211a in the axial direction is denoted by h1, the height of the magnetic-pole portion 211c in the axial direction is denoted by h2, and the height of the flange portion 211b in the axial direction is denoted by h3, the following relationships are satisfied:

$$h1 > h2$$

$$h1 - h2 > h3$$

The thin-wall portion 211d includes a first thin-wall portion 211d(1) extending at a predetermined angle α1 with respect to the circumferential direction and having a predetermined width w1. The first thin-wall portion 211d(1) has a shape of a multiple thread screw, and the number of threads J can be expressed as follows:

$$J = M/2$$

In the second embodiment where the magnet 201 has 8 poles, the number of threads is 4.

The thin-wall portion 211d also includes a second thin-wall portion 211d(2) extending at a predetermined angle α2 with respect to the circumferential direction and having a predetermined width w2. The second thin-wall portion 211d(2) has a shape of a multiple thread screw, and the number of threads is equal to that of the first thin-wall portion 211d(1).

The shape of the magnetic-pole portions 211c(1) and 211c(2) is determined in accordance with the thin-wall portions 211d(1) and 211d(2).

The thin-wall portions 211d(1) and 211d(2) are preferably formed such that the predetermined angles α1 and α2 have the following relationship:

$$\alpha 1 \leq \alpha 0 = \theta \leq \alpha 2$$

Although the thin-wall portions 211d(1) and 211d(2) are formed in a continuous pattern in the second embodiment, they may be divided from each other by the magnetic-pole portions 211c(1) and 211c(2), or the thin-wall portions 211d(1) and 211d(2) may partially extend through the cylindrical portion 211a in the radial direction.

The thin-wall portions 211d(1) and 211d(2) can be formed by multiple thread cutting.

Specifically, this forming process starts with preparing a tap 1 having J threads and a lead angle equal to the angle α1 and a tap 2 having J threads and a lead angle equal to the angle α2. Then, with respect to the first yoke 211 having the cylindrical portion 211a and the flange portion 211b, a first thin-wall portion 211d(1) is formed in the inner periphery of the cylindrical portion 211a by using the tap 1. Subsequently, the tap 2 is used to form a second thin-wall portion 211d(2) in the inner periphery of the cylindrical portion 211a. As a result, the first yoke 211 having the shape according to the second embodiment can be obtained. In the case where the flange portion 211b is a separate component, the flange portion 211b may be attached to the cylindrical portion 211a by, for example, welding after completion of the thread cutting process performed on the cylindrical portion 211a. Alternatively, the flange portion 211b may be formed by, for example, cutting the outer periphery of the cylindrical portion 211a after completion of the thread cutting process performed on the cylindrical portion 211a.

The shape of the magnetic-pole portion 211c and the thin-wall portion 211d is freely modifiable by changing the teeth shape and the lead angle of each tap. For example, the height h2 of the magnetic-pole portion 211c in the axial direction is freely modifiable.

Because the second yoke 221 has the same structure as the first yoke 211, the description thereof will not be repeated. More specifically, the second yoke 221 has components 221c(1), 221c(2), 221d(1), and 221d(2) that respectively correspond to and have the same shape as the components 211c(1), 211c(2), 211d(1), and 211d(2) included in the first yoke 211.

The first yoke 211 and the second yoke 221 are combined such that the magnetic-pole portion 211c of the first yoke 211 and a magnetic-pole portion 221c of the second yoke 221 have a predetermined phase difference. In the case where the magnetic-pole portions 211c(1) and 221c(1) have a phase difference P/2 at a plane where the flange portion 211b and a flange portion 221b contact each other, the phase difference P/2 can be expressed as follows:

$$P/2 = 360°/(2 \times M)$$

In the second embodiment where the magnet 201 has 8 poles, the phase difference P/2 is 22.5°.

Operation of Driving Device

Figure 8:
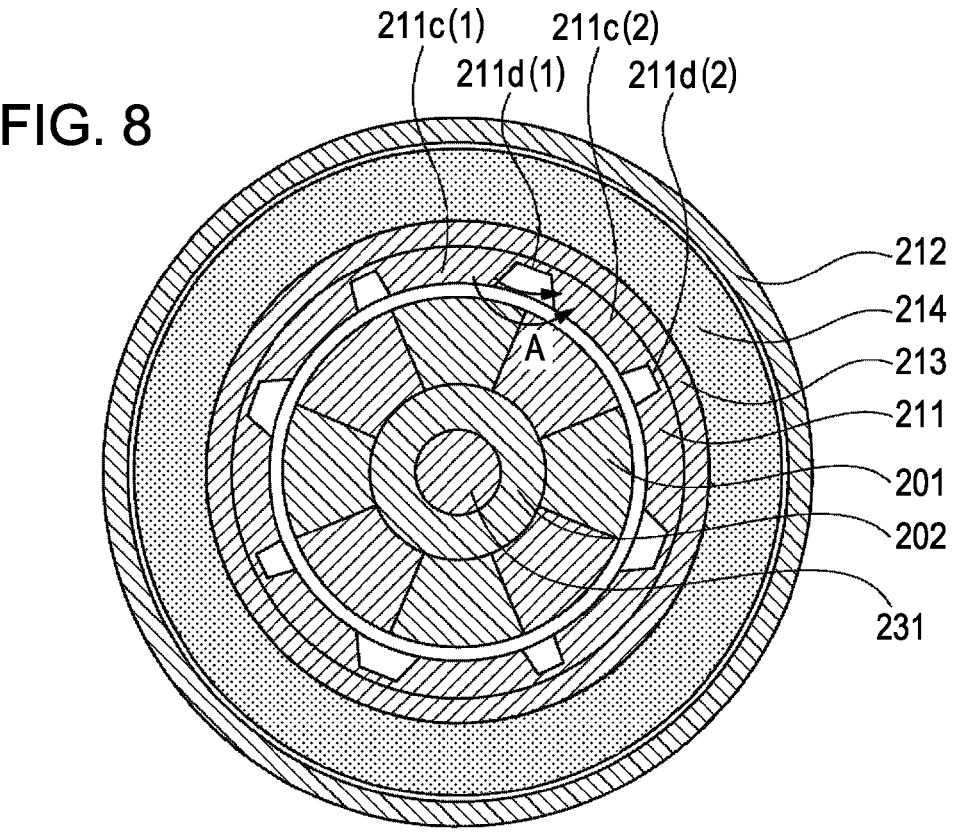
FIG. 8 is a cross-sectional view of the driving device according to the second exemplary embodiment taken along a line extending in a radial direction thereof.

FIG. 8 is a cross-sectional view of the driving device according to the second embodiment taken along a line extending in the radial direction thereof.

First, the operation of the first stator 210 is described below.

When an electric current is applied to the first coil 214, a magnetic field centered around the conducting line of the first coil 214 is generated. In response to this magnetic field, magnetic flux is produced in the cylindrical portion 211a of the first yoke 211, the flange portion 211b of the first yoke 211, and the interior of the first casing 212, thus forming a magnetic path. As the electric current is increased to amplify the magnetic flux produced in the first yoke 211 and the interior of the first casing 212, flux saturation occurs in a region where the cross-sectional area taken along a line extending in the direction of magnetic flux is small, resulting in leakage of the magnetic flux into the air.

In the second embodiment, the thin-wall portion 211d of the first yoke 211 is made thinner in the radial direction as compared to the thickness of the magnetic-pole portion 211c in the radial direction, the thickness of the flange portion 211b in the axial direction, and the thicknesses of the first casing 212 in the radial and axial directions. Therefore, the thin-wall portion 211d is where flux saturation is most likely to occur, which implies that magnetic flux leaks into the air in between the first magnetic-pole portion 211c(1) and the second magnetic-pole portion 211c(2).

For example, referring to FIGS. 7 and 8, when a sufficient amount of electric current is applied to the first coil 214, flux saturation occurs at the first thin-wall portion 211d(1), and the magnetic flux leaks in a direction of an arrow A, causing the first magnetic-pole portion 211c(1) to be excited to the N-pole and the second magnetic-pole portion 211c(2) to be excited to the S-pole. In this case, forces acting in the rotational and axial directions are produced on the movable unit 200 due to an interaction between the leakage magnetic flux and the magnetic field generated by the magnet 201. Since the movable unit 200 is restricted from moving in the rotational direction by the rotation stopper (not shown), the movable unit 200 only receives the force acting in the axial direction, so as to become shifted by a predetermined distance in the axial direction. Because the second stator 220 operates in the same manner, the description of the operation thereof will not be repeated.

By sequentially switching the direction of electric current applied to the first coil 214 and the second coil 224, a translatory movement of the movable unit 200 including the magnet 201 and the tube 202 can be achieved similarly as in the driving device disclosed in Japanese Patent Laid-Open No. 2006-121829.

As described above, the magnetic-pole portion 211c in the driving device according to the second embodiment can advantageously be formed by thread cutting, whereby a low-cost driving device can be provided.

Regarding the spirally extending magnetic-pole teeth in the related art, the magnetic-pole teeth tend to be longer than the inner diameter of the yoke. This makes it difficult to form the magnetic-pole teeth by press-working, resulting in less design flexibility.

In contrast, in the driving device according to the second embodiment, the shape of each magnetic-pole portion is freely modifiable by changing the teeth shape and the lead angle of the corresponding tap. Consequently, a yoke having long magnetic-pole teeth can be formed easier as compared to the related art, whereby the second embodiment of the present invention can provide a driving device at low cost.

In contrast to the related art where a pair of magnetic-pole portions excited by a single coil is provided as separate components, the pair of magnetic-pole portions in the driving device according to the second embodiment is formed integrally. Thus, the positional relationship between the magnetic-pole teeth can be determined accurately, and the magnetic-pole portions can be made more resistant to deformation. As a result, a driving device with stable performance can be provided.

By replacing the magnet and the yokes in the second embodiment with the magnet and the yokes in the first embodiment, the driving device according to the second embodiment can have a similar function to the motor described above in the first embodiment.

Third Exemplary Embodiment

A driving device according to a third exemplary embodiment of the present invention has basically the same structure as the driving device according to the second exemplary embodiment, but differs from the driving device according to the second exemplary embodiment in the shape of the magnetic-pole teeth. Therefore, the similar configurations of the driving device that have already been described above in the second embodiment will not be described again.

Figure 9:
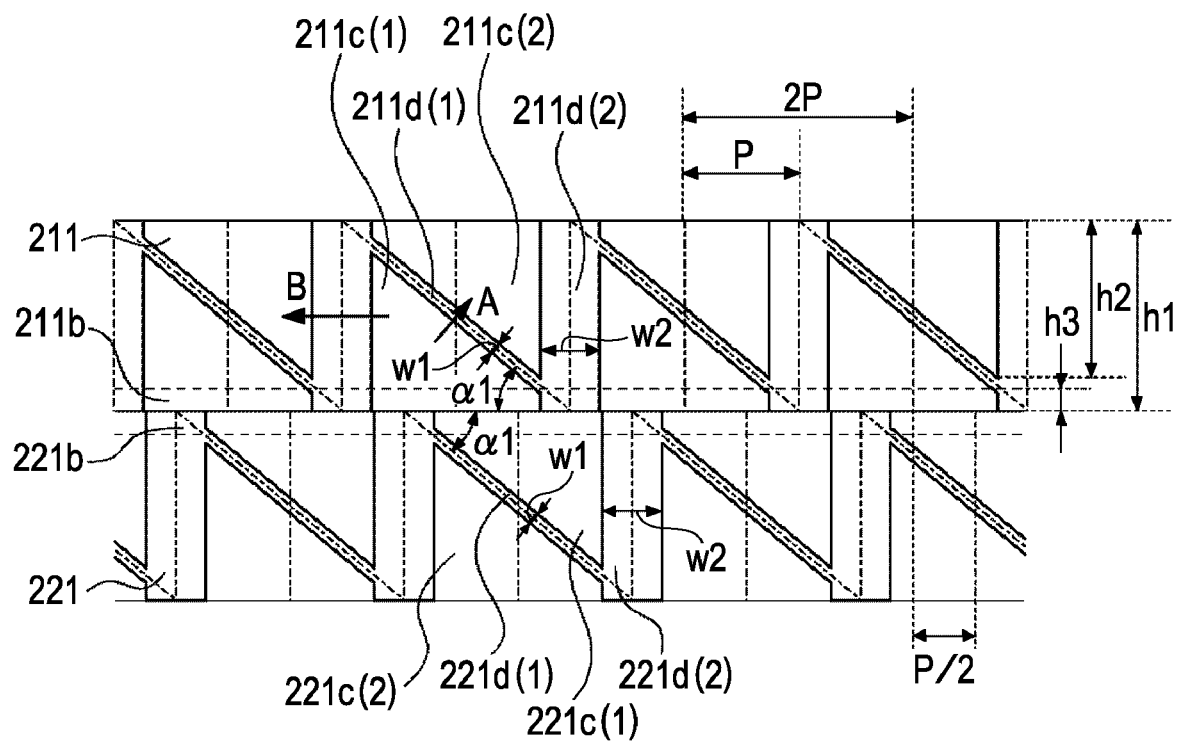
FIG. 9 is an unrolled view of yokes included in the driving device according to a third exemplary embodiment of the present invention.
Figure 10A:
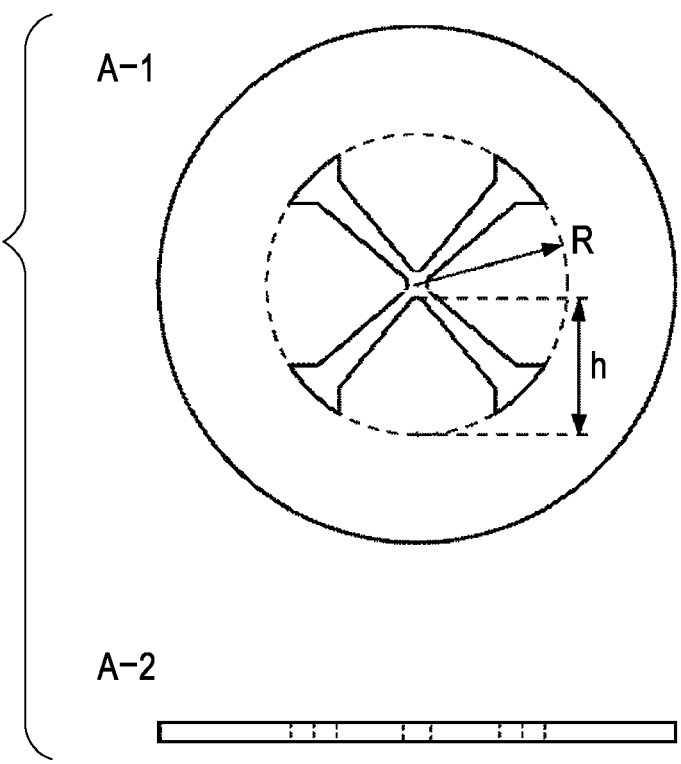
FIGS. 10A and 10B illustrate a yoke manufactured by press-working.
Figure 10B:
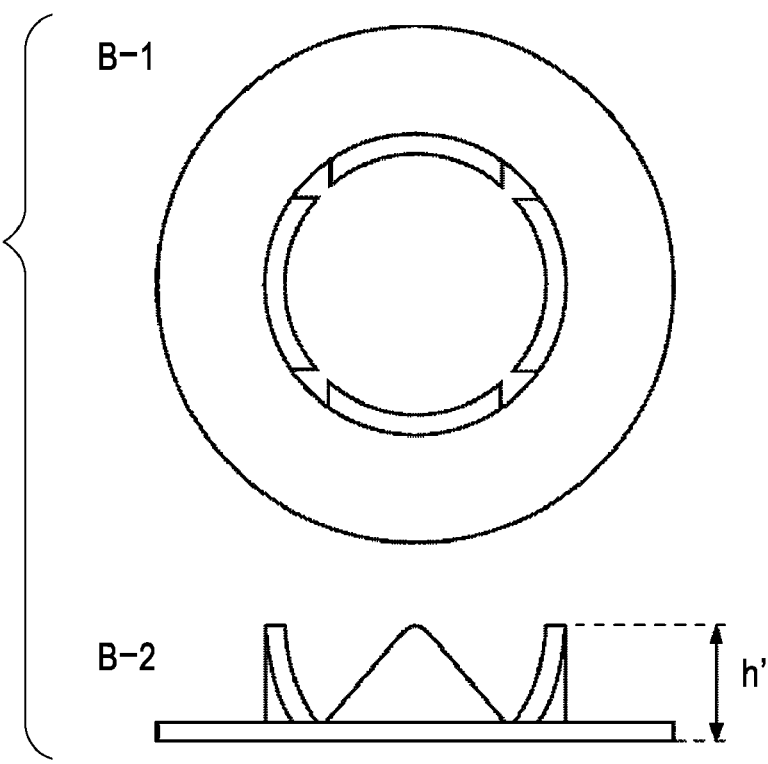
Figure 11A:
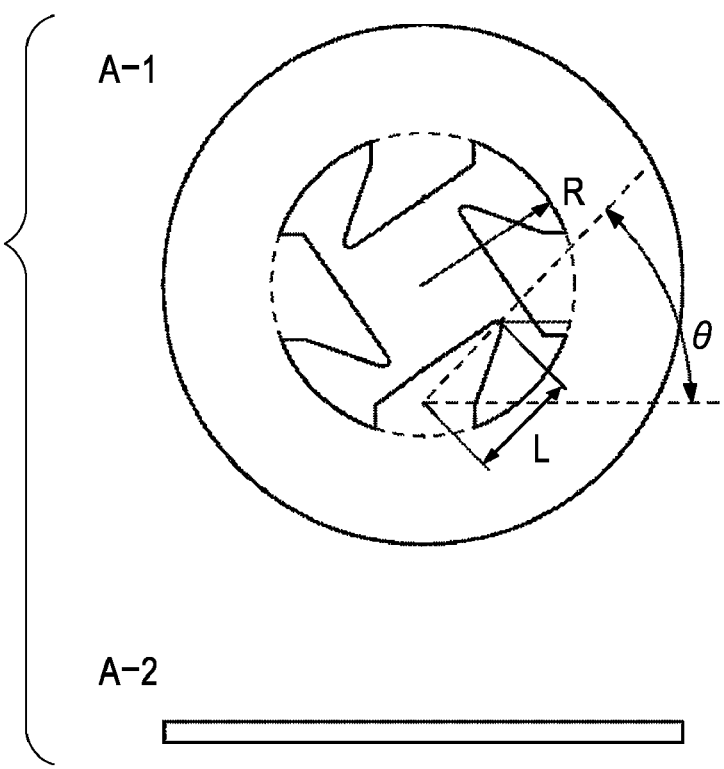
FIGS. 11A and 11B illustrate a yoke manufactured by press-working and having slanted magnetic-pole teeth.
Figure 11B:
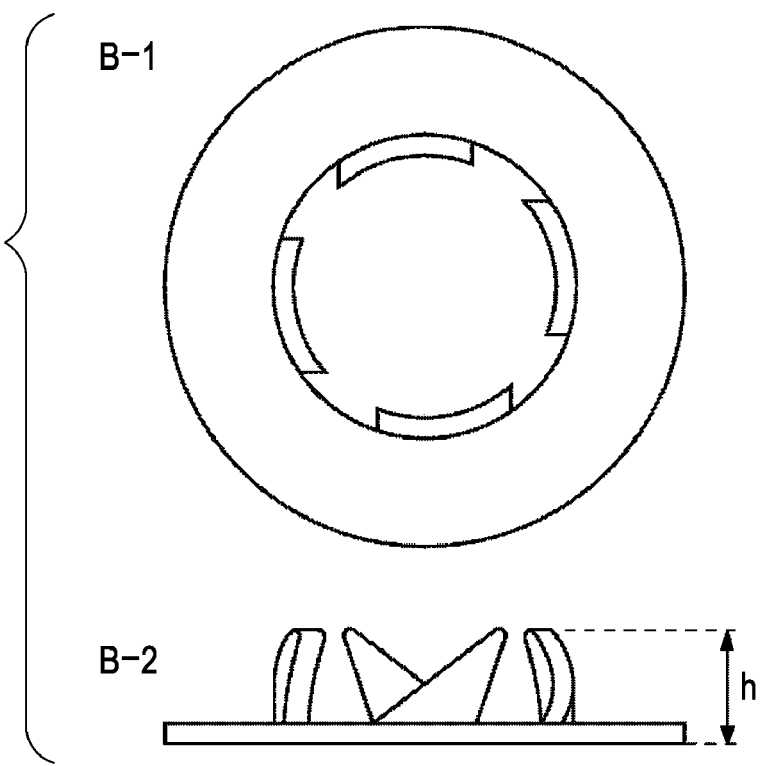

FIG. 9 is an unrolled view of the yokes included in the driving device according to the third embodiment.

The magnetic-pole teeth in the third embodiment differ in shape from those in the second embodiment particularly in that the angle α2 is as follows:

$$\alpha 2 = 90°$$

Preferably, the angle α1, the width w1, and the width w2 have the following relationship:

$$\alpha 1 = \theta$$

$$w1 < w2$$

Because the angle α1 of the first thin-wall portion 211d(1) corresponds to the angle of magnetization of the magnet 201, the direction of leakage magnetic flux A is orthogonal to the angle of magnetization of the magnet 201 and significantly contributes to the generation of the rotational force and the translatory force. On the other hand, the direction of leakage magnetic flux B significantly differs from the angle of magnetization of the magnet 201 and is much less contributive to the generation of the rotational force and the translatory force. In the third embodiment, the width w1 of the first thin-wall portion 211d(1) is made smaller than the width w2 of the second thin-wall portion 211d(2), which means that the percentage of the leakage magnetic flux A is greater relative to that of the leakage magnetic flux B. In other words, since the direction of the leakage magnetic flux A has higher output efficiency, a larger amount of magnetic flux flows in that direction.

In the third embodiment, the second thin-wall portion 211d(2) is longitudinally aligned with the extending direction of the guide shaft, and can thus be formed by splining instead of thread cutting. This can allow for an easier machining process, whereby a driving device can be provided at lower cost.

Regarding the spirally extending magnetic-pole teeth in the related art, the magnetic-pole teeth tend to be longer than the inner diameter of the yoke. This makes it difficult to form the magnetic-pole teeth by press-working, resulting in less design flexibility. In contrast, in the driving device according to the third embodiment, the shape of each magnetic-pole portion is freely modifiable by changing the teeth shape of the tap. Consequently, a yoke having long magnetic-pole teeth can be formed readily, whereby a driving device can be provided at low cost.

In contrast to the related art where a pair of magnetic-pole portions excited by a single coil is provided as separate components, the pair of magnetic-pole portions in the driving device according to the third embodiment is formed integrally. Thus, the positional relationship between the magnetic-pole teeth can be determined accurately, and the magnetic-pole portions can be made more resistant to deformation. As a result, a driving device with stable performance can be provided.

Although the third embodiment is directed to a configuration where the magnet is movable, an alternative configuration is permissible where the magnet is fixed to the guide shaft and the yokes are disposed in a movable manner. Even in that case, the advantages achieved by the driving device according to the third embodiment can be similarly achieved.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-278965 filed Oct. 26, 2007, which is hereby incorporated by reference herein in its entirety.

What is claimed is:

1. A motor comprising:
a cylindrical magnet whose outer periphery has a plurality of magnetized segments;
a cylindrical yoke having an inner periphery that is disposed facing the magnet;
a coil that excites the yoke;
a first magnetic-pole portion that is formed in the inner periphery of the yoke, and is excited by the coil; and
a second magnetic-pole portion that is formed in the inner periphery of the yoke, and is excited by the coil to a pole that is different from that of the first magnetic-pole portion,
wherein a first thin-wall portion is formed connecting the first magnetic-pole portion and the second magnetic-pole portion in the inner periphery of the yoke, a thickness of the first thin-wall portion is smaller in a radial direction of the yoke as compared to thicknesses of the first magnetic-pole portion and the second magnetic-pole portion in the radial direction, the first thin-wall portion extends at a first predetermined angle with respect to a circumferential direction of the inner periphery, wherein a second thin-wall portion is formed connecting the first magnetic-pole portion and the second magnetic-pole portion in the inner periphery of the yoke, a thickness of the second thin-wall portion is smaller in the radial direction of the yoke as compared to thicknesses of the first magnetic-pole portion and the second magnetic-pole portion in the radial direction, the second thin-wall portion extends at a second predetermined angle with respect to the circumferential direction of the inner periphery, and wherein the first predetermined angle and the second predetermined angle are different from each other.

2. The motor according to claim 1, wherein the outer periphery of the magnet is magnetized in a spiral form.

3. The motor according to claim 2, wherein the first thin-wall portion and the second thin-wall portion are formed in the inner periphery of the yoke by thread cutting and portions of the inner periphery of the yoke not formed by the thread cutting comprises the first magnetic-pole portion and the second magnetic-pole portion.

4. The motor according to claim 3, wherein the first thin-wall portion and the second thin-wall portion are formed by using two different kinds of taps.

5. The motor according to claim 1, wherein boundaries of the plurality of magnetized segments incline at a third predetermined angle, wherein the first predetermined angle is smaller than the third predetermined angle, and wherein the second predetermined angle is equal or larger the third predetermined angle.

6. The motor according to claim 1, wherein the first thin-wall portion has a first width and the second thin-wall portion has a second width, and wherein the first width and the second width are different from each other.

* * * * *